Figure 1:
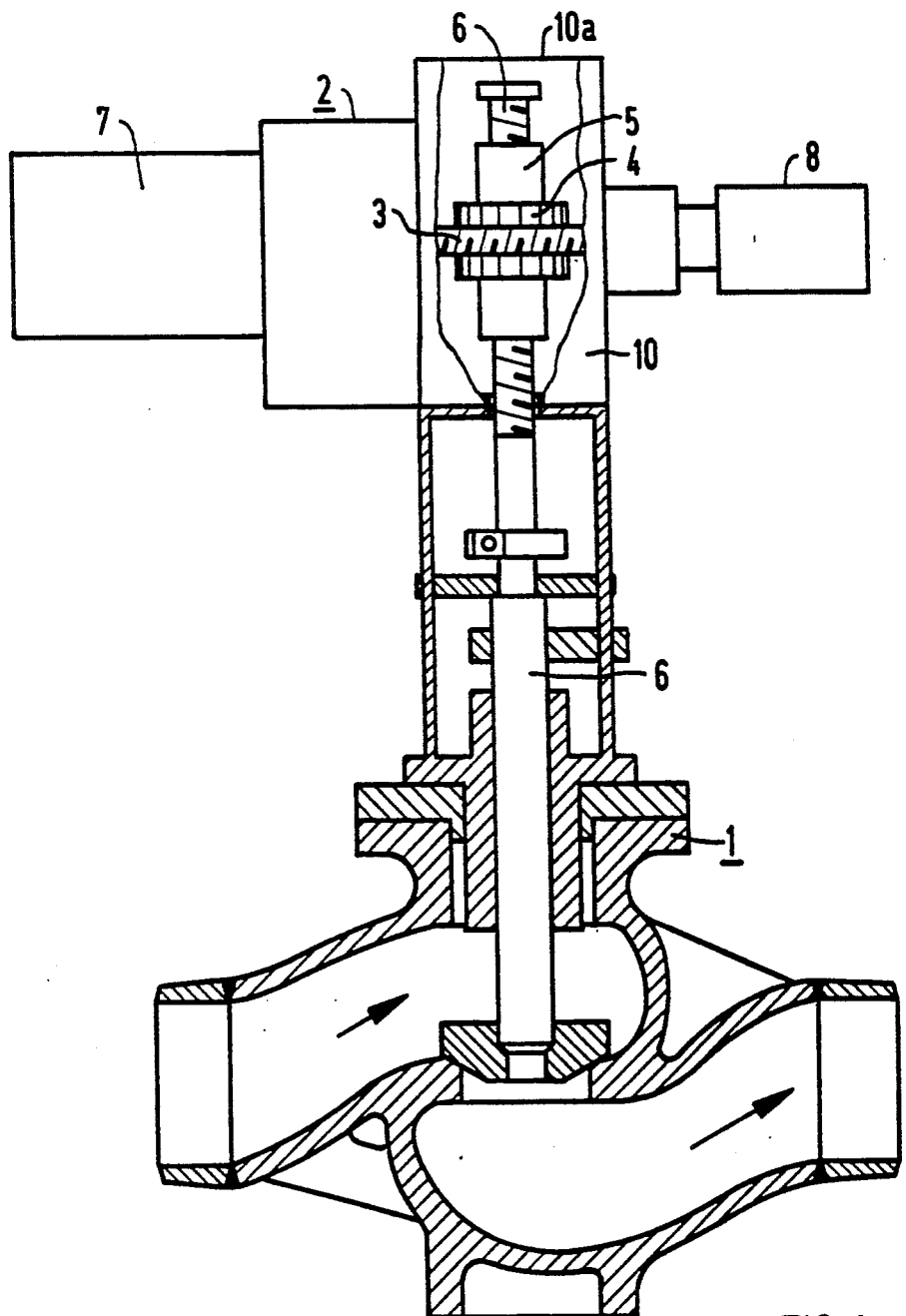

United States Patent [19]

Peter et al.

[11] Patent Number: 5,146,791
[45] Date of Patent: Sep. 15, 1992

[54] APPARATUS AND METHOD FOR MEASURING A SPINDLE FORCE

[75] Inventors: Martin Peter; Markus Reismann, both of Erlangen, Fed. Rep. of Germany

[73] Assignee: Siemens Aktiengesellschaft, Munich, Fed. Rep. of Germany

[21] Appl. No.: 622,940

[22] Filed: Dec. 6, 1990

[30] Foreign Application Priority Data

Jun. 5, 1990 [DE] Fed. Rep. of Germany ... 9006338[U]

[51] Int. Cl.[5] .............................................. G01L 5/12
[52] U.S. Cl. .............................. 73/862.49; 73/862.627; 73/168
[58] Field of Search ............... 73/168; 862.49, 862.54, 73/862.65, 862.52

[56] References Cited

U.S. PATENT DOCUMENTS 2,458,481  9/1944  Ruge .................. 73/862.65 X
4,280,363  7/1981  Johansson .
4,912,984  4/1990  McMennamy et al. ..... 73/862.49 X

FOREIGN PATENT DOCUMENTS 8610226  9/1987  Fed. Rep. of Germany .
3936525  5/1990  Fed. Rep. of Germany .

Primary Examiner—Michael Razavi
Assistant Examiner—Elizabeth L. Shopbell
Attorney, Agent, or Firm—Herbert L. Lerner; Laurence A. Greenberg

[57] ABSTRACT

A measuring apparatus for determining a force exerted by a spindle, in particular a spindle of a fitting, associated with a spindle housing includes a measuring apparatus housing to be firmly connected to the spindle housing. A plunger is disposed in the measuring apparatus housing for being acted upon by a force exerted by the spindle. A mechanical spring is braced against the measuring apparatus housing and operatively connected to the plunger. A strain gauge is disposed on the plunger. A method for determining a force exerted by a spindle, in particular a spindle of a fitting, includes coupling a housing of a measuring apparatus to a housing associated with a spindle. The spindle is moved toward a plunger of the measuring apparatus for raising the plunger, moving a mechanical spring operatively connected to the plunger toward the measuring apparatus housing and compressing the mechanical spring. The force necessary for moving the spindle, raising the plunger and moving and compressing the mechanical spring is measured and determined with a strain gauge disposed at the plunger.

11 Claims, 2 Drawing Sheets

APPARATUS AND METHOD FOR MEASURING A SPINDLE FORCE

The invention relates to a measuring apparatus and method for determining a force exerted by a spindle, in particular a spindle of a fitting.

Measuring spindle forces is necessary in order to evaluate the function of an armature or fitting. The spindle force provides an indication of whether the fitting is fully functional or requires repair. Often the functional relationship of the spindle force and the spindle displacement travel is determined in order to judge whether a fitting is functional. Separate pickup devices are then provided for the displacement travel and for the spindle force.

A device often used for measuring a spindle force provides strain gauges that are glued directly to the spindle.

In some fittings, the spindle is not freely accessible. In that case the spindle force must be determined indirectly.

Such an indirect measurement is performed, for instance, by ascertaining the displacement travel of a worm shaft in the actuating unit of the fitting, after previously determining the functional relationship between the displacement travel and the spindle torque by means of calibration measurement. Such calibration measurement is performed on a torque test bench. To this end, the actuating unit must be removed from the fitting. With the aid of the calibration measurement, a spindle torque can be determined later from a measured displacement travel. By taking the geometry and frictional behavior of the spindle into account, the spindle force can then be calculated from the torque.

Such a method is very labor-intensive and expensive, because it requires a complicated calibration measurement.

Furthermore, the method described above cannot be performed in a fitting of the type in which the actuating unit cannot be removed from the fitting or can be removed only with great effort. In American systems especially, the actuating unit cannot be removed except with very great difficulty, because it is wired directly, without plugs. The wiring is often accommodated in armored pipes. The spindle nut of the fitting spindle is also usually built into the actuating unit.

It is accordingly an object of the invention to provide an apparatus and method for measuring a spindle force, which overcomes the hereinafore-mentioned disadvantages of the heretofore-known methods and devices of this general type, and that can be used in fittings in which on one hand the spindle is poorly accessible, and on the other hand the actuating unit cannot be removed from the fitting, or can only be removed with difficulty.

With the foregoing and other objects in view there is provided, in accordance with the invention, a measuring apparatus for determining a force exerted by a spindle, in particular a spindle of a fitting, associated with a spindle housing, comprising a measuring apparatus housing to be firmly connected to the spindle housing, a plunger being disposed in the measuring apparatus housing for being acted upon by a force exerted by the spindle, a mechanical spring braced against the measuring apparatus housing and operatively connected to the plunger, and a strain gauge disposed on the plunger.

With this kind of measuring apparatus, the spindle force, that is the force acting upon a fitting spindle, can be measured directly, without a need for accessibility of the fitting spindle in order to attach strain gauges. Removing the actuating unit from the fitting, which is not always possible, is not necessary either. The measuring apparatus of the invention can, in fact, be mounted not only on the fitting but also on the mounted actuating unit. The plunger of the measuring apparatus should be connected to the spindle of the fitting.

The spindle force of a fitting can be adequately determined by using the measuring apparatus of the invention even if there is only one connection flange on the actuating unit and only one end surface of the spindle is reachable. The advantage of this is that the spindle force can be measured even in a fixed-wired, encapsulated combination of fitting and actuating unit, without having to open the fitting or the actuating unit and also without having to remove the actuating unit from the fitting.

The measuring apparatus of the invention can therefore be used particularly advantageously in American systems.

In accordance with another feature of the invention, the plunger reciprocates in a given direction and has a shoulder-like shaped portion in the form of a projection or a recess; and there is provided a bell-shaped spring cup supported on the shaped portion having an upper portion facing toward and bent at an angle toward the plunger and resting on the shaped portion, a middle portion adjoining the upper portion and extending alongside and aligned parallel with the plunger counter to the given direction, and a lower portion adjoining the middle portion and facing and being bent away from the plunger; the measuring apparatus housing has a formed-on portion on a side wall pointing toward the plunger and being disposed above the lower portion of the spring cup as seen in the given direction; and the mechanical spring being disposed between the lower portion of the spring cup and the formed-on portion.

In accordance with a further feature of the invention, the spring is a stable cup spring.

In accordance with an added feature of the invention, one or more strain gauges are disposed on the plunger. For example, two strain gauges may be disposed opposite one another on the plunger. Good measurement results are obtained in this way.

Upon displacement of the plunger and spring cup toward the spring that is supported on the formed-on portion of the housing, the plunger is briefly deformed by the spindle force acting upon it. This deformation is recorded by the strain gauge or gauges and evaluated in an evaluation unit. The measured values of the strain gauge or gauges make it possible to determine the spindle force.

In accordance with an additional feature of the invention, the spring cup has a rated or predetermined braking point. Thus the actuating unit is protected against an overload, even if a shutoff device should happen to be unable to function. Under normal conditions, a shutoff device of this type switches off the actuating unit whenever the mechanical resistance attains a certain value. If this shutoff device should fail, the actuating unit and thus the spindle would press constantly against the measuring apparatus. This could damage the actuating unit. Through the use of the predetermined braking point of the spring cup provided by way of example according to the invention, damage to the actuating unit is precluded, since if the force is too high, the plunger is no longer retained by the spring cup, and the spindle can be moved as far as its terminal position. Even if there is a defect of the shutoff device of the armature or fitting, neither the armature or fitting nor the actuating unit is damaged when the measuring apparatus according to the invention is used.

In accordance with yet another feature of the invention, the plunger has an end with a disk of soft material on the end that can be connected to the spindle. This provides optimal coupling to a spindle.

In accordance with yet a further feature of the invention, the rigidity of the spring in the measuring apparatus is equivalent to the rigidity of the device that contains the spindle exerting a force upon it. Dynamic effects that could arise upon opening or closing of the fitting therefore have no significance.

The measuring apparatus of the invention is advantageously usable for fittings having difficult access and having actuating units that can be removed only with difficulty.

With the objects of the invention in view, there is also provided a method for determining a force exerted by a spindle, in particular a spindle of a fitting, with the measuring apparatus described above, which comprises coupling a housing of a measuring apparatus to a housing associated with a spindle, for instance an armature or fitting housing or an actuating unit housing; then moving the spindle toward a plunger of the measuring apparatus for raising the plunger along with a spring cup, moving a mechanical spring operatively connected to the plunger toward the measuring apparatus housing, for instance toward a formed-on portion of the housing, and compressing the mechanical spring; and measuring and determining the force necessary for accomplishing this at the plunger with a strain gauge, or oppositely disposed strain gauges, disposed at the plunger.

This method enables simple, rapid measurement of spindle force to take place. The time expenditure for measurement is only one-quarter the time expenditure for measurement by a previously known method, which required calibration measurement on a torque test bench.

An advantage attained with the measuring apparatus and the method of the invention is in particular that a spindle force measurement can be performed quickly and reliably and without disassembly on a fitting that is not accessible and is equipped with an actuating unit that cannot be removed.

Other features which are considered as characteristic for the invention are set forth in the appended claims.

Although the invention is illustrated and described herein as embodied in an apparatus and method for measuring a spindle force, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
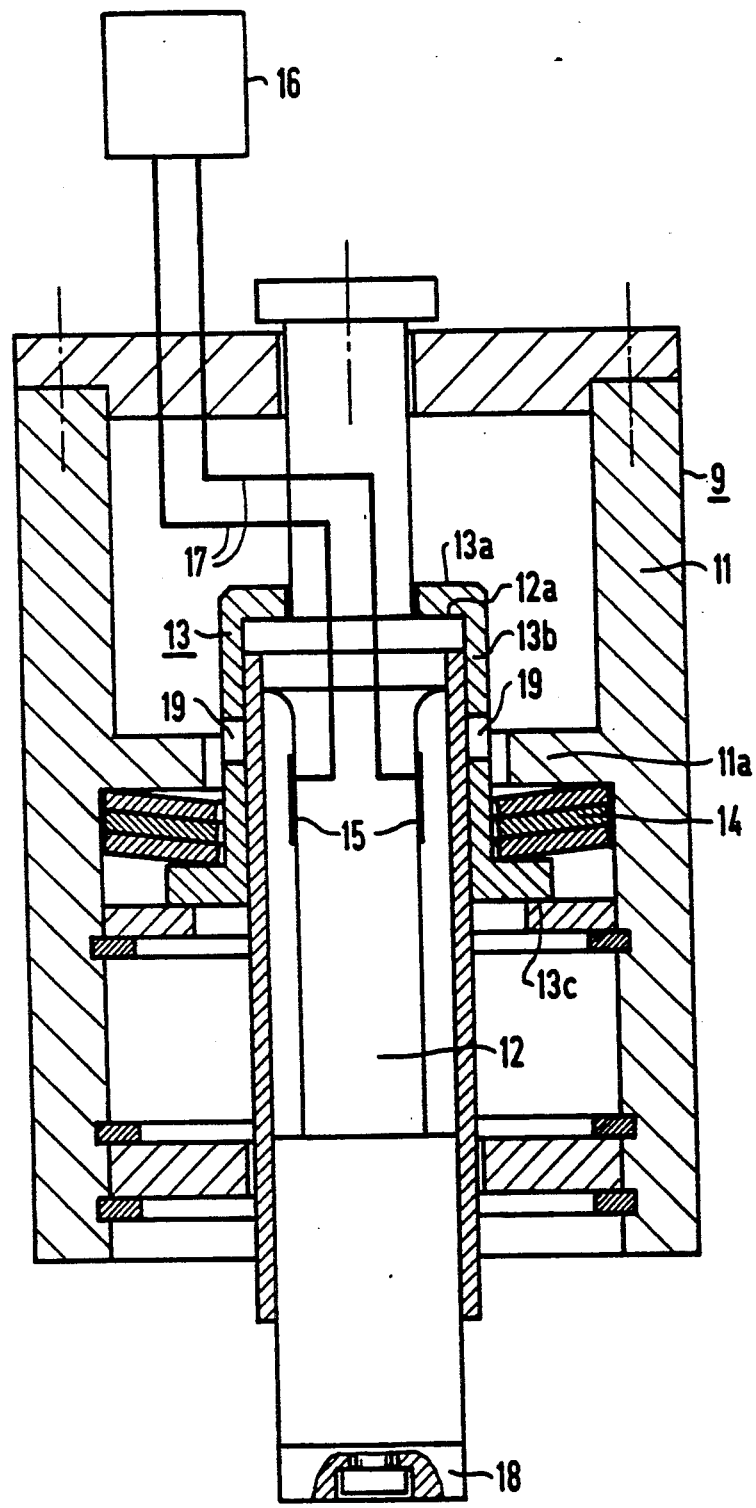

FIG. 1 is a diagrammatic, longitudinal-sectional and partly broken-away view of a fitting with an actuating unit mounted thereon, wherein the actuating unit has a device for receiving a spindle force measuring apparatus and is connected to a displacement travel pickup; and FIG. 2 is a longitudinal-sectional view showing the structure of a spindle force measuring apparatus.

Referring now to the figures of the drawings in detail and first, particularly, to FIG. 1 thereof, there is seen an actuating unit 2 disposed on an armature or fitting 1. A worm shaft 3 of the actuating unit 2 is operatively connected through a worm wheel 4 and a spindle nut 5, to a spindle 6 of the fitting 1. The worm shaft 3 is connected to a motor 7 of the actuating unit 2. The spindle nut 5 and thus the spindle 6 of the fitting 1 are moved through the worm shaft 3. In order to determine the functional relationship between the displacement travel and the spindle force at the fitting 1, a travel pickup 8 may be connected to the worm shaft 3. The displacement travel is measured with the travel pickup 8. In order to measure the spindle force, an apparatus for measuring the spindle force, such as an measuring apparatus 9 shown in FIG. 2, may be connected to the spindle 6. A housing 10 of the actuating unit 2 has a connection flange 10a for the measuring apparatus 9. In order to evaluate the results of a measurement and determine a functional relationship between the displacement travel and the spindle force, the travel pickup 8 and the measuring apparatus 9 are electrically connected to a non-illustrated evaluation unit.

The apparatus 9 for measuring the spindle force which is shown in FIG. 2, has a measuring apparatus housing 11 which can be mounted on the connection flange 10a of the housing 10 of the actuating unit 2, or on a connection flange of the housing of the fitting 1. As is shown in FIG. 2, a plunger 12 which can be connected to the spindle 6 of FIG. 1, is located inside the housing 11. The plunger 12 has a shoulder-like shaped portion 12a in the form of a projection or a recess. Resting on the shaped portion 12a is a spring cup 13. The spring cup 13 includes an upper portion 13a, which extends perpendicular to the plunger 12 and is supported on the shoulder-like shaped portion 12a. A middle portion 13b extends parallel to the plunger 12 and counter to its reciprocation or stroke direction. A lower portion 13c is disposed perpendicular to the plunger 12 and points away from it. When the plunger 12 is not loaded, a formed-on portion 11a of the housing 11 points in the direction of the plunger 12, at a distance above the lower portion 13c of the spring cup 3 in the reciprocation or stroke direction of the plunger 12. The distance between the lower portion 13c of the spring cup 13 and the formed-on portion 11a is filled by a spring 14, in particular a cup spring. A stop is located on the housing 11 below the spring cup 13. Two strain gauges 15 are disposed opposite one another on the plunger 2 in the vicinity of the middle portion 13b of the spring cup 13.

In order to indirectly measure the spindle force of the spindle 6 of the fitting 1 of FIG. 1, the spindle 6 is moved toward the plunger 12. This raises the plunger 12 of FIG. 2. In the process, the plunger 12 carries the spring cup 13 along with it. The spring 14 is pressed against the formed-on portion 11a by the spring cup 13. As a result, the spring 14 is compressed. The force necessary for this is determined at the plunger 12 with the strain gauges 15, by using an evaluation unit 16 that is electrically connected to the strain gauges 15 through lines 17.

As a rule, two strain gauges 15 are needed to determine the spindle force and they are disposed opposite one another on the plunger 12. However, a different number and disposition of strain gauges 15 may be provided as well. A plurality of springs 14 may also be present. In order to ensure that the spindle force measured is not measured incorrectly on account of the measuring apparatus 9, the rigidity of the spring 14 is selected in such a way that it is largely equivalent to the rigidity of the fitting 1. For better coupling of the measuring apparatus 9 to the actuating unit 2, the end of the plunger 12 that is to be connected to the spindle 6 has a disk 18 of soft material.

In the event that shutoff of the motor 7 is not possible and if the actuating unit 2 is somehow defective, a mechanical overload of the spindle 6 could occur because of the mounted measuring apparatus 9. In order to prevent such an overload, the spring cup 13 of the measuring apparatus 9 has one or more predetermined or rated breaking points 19.

We claim:

1. Measuring apparatus for determining a force exerted by a spindle associated with a spindle housing, comprising a measuring apparatus housing to be firmly connected to the spindle housing, a plunger being disposed in said measuring apparatus housing for being acted upon by a force exerted by the spindle, a mechanical spring braced against said measuring apparatus housing and operatively connected to said plunger, and a strain gauge disposed on said plunger.

2. Measuring apparatus according to claim 1, wherein the spindle is partly disposed in a fitting.

3. Measuring apparatus according to claim 1, wherein said plunger reciprocates in a given direction and has a shoulder-like shaped portion; and including a spring cup having an upper portion facing toward said plunger and resting on said shaped portion, a middle portion adjoining said upper portion and extending alongside said plunger counter to said given direction, and a lower portion adjoining said middle portion and facing away from said plunger; said measuring apparatus housing has a formed-on part pointing toward said plunger and being disposed above said lower portion of said spring cup as seen in said given direction; and said mechanical spring being disposed between said lower portion of said spring cup and said formed-on portion.

4. Measuring apparatus according to claim 1, wherein said mechanical spring is a cup spring.

5. Measuring apparatus according to claim 1, including at least one other strain gauge disposed on said plunger.

6. Measuring apparatus according to claim 1, including another strain gauge disposed on said plunger, said two strain gauges being disposed opposite one another on said plunger.

7. Measuring apparatus according to claim 3, wherein said spring cup has a predetermined breaking point.

8. Measuring apparatus according to claim 1, wherein said plunger reciprocates in a given direction, and said plunger has a lower end as seen in said given direction, and a disk of soft material on said lower end.

9. Measuring apparatus according to claim 1, wherein said mechanical spring has a rigidity equivalent to the rigidity of a device containing the spindle.

10. Method for determining a force exerted by a spindle, which comprises coupling a housing of a measuring apparatus to a housing associated with a spindle; moving the spindle toward a plunger of the measuring apparatus for raising the plunger, moving a mechanical spring operatively connected to the plunger toward the measuring apparatus housing and compressing the mechanical spring; and measuring and determining the force necessary for moving the spindle, raising the plunger and moving and compressing the mechanical spring at the plunger with a strain gauge disposed at the plunger.

11. Method according to claim 10, which comprises moving the spindle in a fitting.

* * * * *